US008478203B2

(12) United States Patent
Wang

(10) Patent No.: US 8,478,203 B2
(45) Date of Patent: Jul. 2, 2013

(54) PHASE SYNCHRONIZATION OF BASE STATIONS VIA MOBILE FEEDBACK IN MULTIPOINT BROADCASTING

(76) Inventor: Xiao-an Wang, Allentown, PA (US)

( * ) Notice: Subject to any disclaimer, the term of this patent is extended or adjusted under 35 U.S.C. 154(b) by 170 days.

(21) Appl. No.: 13/194,992

(22) Filed: Jul. 31, 2011

(65) Prior Publication Data

US 2013/0029586 A1    Jan. 31, 2013

(51) Int. Cl.
*H04B 17/00* (2006.01)
(52) U.S. Cl.
USPC ........ 455/67.16; 455/23; 455/276.1; 455/304
(58) Field of Classification Search
USPC ................. 455/23, 42, 60, 67.16, 139, 180.3, 455/205, 260, 276.1, 304; 370/516, 518
See application file for complete search history.

(56) References Cited

U.S. PATENT DOCUMENTS

| | | | |
|---|---|---|---|
| 5,438,591 A * | 8/1995 | Oie et al. ...................... 375/261 |
| 6,160,855 A * | 12/2000 | Nakamura et al. ............. 375/280 |
| 6,421,010 B1 * | 7/2002 | Chadwick et al. ............ 342/465 |
| 6,735,263 B1 * | 5/2004 | Moriya et al. ................ 375/326 |
| 7,342,980 B2 * | 3/2008 | Nair ............................... 375/326 |
| 7,881,417 B2 * | 2/2011 | Kim et al. ...................... 375/355 |
| 8,208,963 B2 * | 6/2012 | Codreanu et al. .......... 455/562.1 |
| 2003/0126489 A1 * | 7/2003 | Johansen et al. .............. 713/401 |
| 2005/0014474 A1 * | 1/2005 | Jitsukawa et al. ............. 455/101 |
| 2005/0143036 A1 * | 6/2005 | Nair ............................... 455/260 |
| 2008/0240729 A1 * | 10/2008 | Toyoda et al. ................. 398/163 |
| 2010/0008346 A1 * | 1/2010 | Shirakata et al. ............. 370/343 |
| 2010/0046658 A1 * | 2/2010 | Yosoku et al. ................ 375/267 |
| 2010/0164789 A1 * | 7/2010 | Basnayake ............... 342/357.04 |
| 2011/0151918 A1 * | 6/2011 | Seo et al. ....................... 455/522 |
| 2011/0261651 A1 * | 10/2011 | Okuda et al. ................... 367/93 |

* cited by examiner

*Primary Examiner* — Dominic E Rego

(57) ABSTRACT

Multipoint broadcasting requires the base stations to be phase-synchronized. Methods and apparatus are described that provide phase synchronization of base stations with the downlink-channel phase feedback by mobile users. Also described are methods and apparatus that make phase synchronization of base stations independent of multipoint-broadcast sessions, thus reducing the synchronization overhead and improving network capacity. The methods and apparatus utilize model-based downlink-channel phase feedback that reduces most of the feedback overhead. Applications of the described methods and apparatus include wireless multipoint broadcast systems, also known as coordinated multipoint transmission, or CoMP, in LTE-A (long-term evolution, advanced) systems, and frequency and phase synchronization of a cluster of base stations, or more generally, of a cluster of wireless devices.

17 Claims, 4 Drawing Sheets

PHASE SYNCHRONIZATION OF BASE STATIONS VIA MOBILE FEEDBACK IN MULTIPOINT BROADCASTING

BACKGROUND

1. Field of Application

The following description relates generally to telecommunications systems and wireless communications systems.

2. Prior Art

Multipoint broadcasting in a wireless cellular network has the potential to increase the network capacity by many folds. In a traditional cellular network, the mobile users experience strong interference at cell edge from the signals of neighbor cells. Multipoint broadcasting coordinates multiple base stations to transmit the signals to a set of mobile users in such a way that the signal intended for a mobile user is enhanced while the interference is minimized. Multipoint broadcasting has been adopted in LTE-A (Long-Term Evolution of 3$^{rd}$ generation of wireless cellular network, Advanced) and is referred to as CoMP (Coordinated Multi-Point transmission).

FIG. 1 illustrates an example multipoint broadcast system. Elements 102, 104, and 106 denote base stations 1, 2, and 3, respectively, and elements 152, 154, and 156 denote mobile stations 1, 2, and 3, respectively. Backbone 100 connects base stations 1, 2, and 3 to allow high-speed information exchange among the base stations. In FIG. 1, base stations 1, 2, and 3 form a set of collaborating multipoint broadcasters. Mobile users 1, 2, and 3 form a set of recipients. Base stations 1, 2, and 3, and mobile users 1, 2, and 3 together form a multipoint-broadcast set. Base stations 1, 2, and 3 transmit the combinations of the signals intended for mobile users 1, 2, and 3. At each base station, the combination "weight" for each mobile user signal can be different. Through elaborate algorithms, at each mobile user the desired signal in the received signal is enhanced whereas the undesired signal or the interference is cancelled or minimized. For example, when the transmitted signals from base stations 1, 2, and 3 arrive at mobile user 1, the signals for mobile users 2 and 3 are cancelled out or minimized, while the signal for mobile user 1 is maximized or enhanced, thus the signal quality of mobile user 1 improves significantly. Similarly, mobile users 2 and 3 will also see significant improvement in the quality of their respective signals. The combining of the different mobile-user signals at each base station is commonly referred to as "pre-coding". The combining weight for each mobile-user signal at for each base station is an element in a so called "pre-coding matrix".

Multipoint broadcasting requires the knowledge of the downlink channel (from base stations to mobile users) to be available at collaborating base stations for pre-coding. In a TDD (time-division duplex) network, base stations can obtain the downlink-channel information from the uplink-channel information by channel reciprocity, which eliminates the need for feedback as is required in an FDD (frequency-division duplex) network.

Ideal channel reciprocity, however, exists only between the antennas of base stations and the mobile users. The transmitter (TX) and the receiver (RX) of a base station are generally different from those of a mobile user or other base stations. This introduces the differences in gains and phases between downlink and uplink channels, and causes the non-reciprocity of the channel. To restore the downlink and uplink channel reciprocity, the differences in gains and phases need to be known. In general, the gain differences and the phase differences can be acquired and compensated separately and differently. It is relatively straightforward to calibrate the gains. On the other hand, phase differences are more critical in multipoint broadcasting, and are more difficult to estimate. When considering the acquisition of phase differences, the gains can be assumed to have been perfectly matched.

FIG. 2 presents a basic model for the non-reciprocity of the channel caused by the phase difference between a base station and a mobile user. Ignoring the gain mismatch, which can be calibrated and compensated separately as mentioned earlier, the TX/RX mismatches can be succinctly characterized by two random phases, carrier phase $\phi^b$ of a base station, and the carrier phase $\phi^m$ of a mobile user. The simple model in FIG. 2 can be shown to cover more elaborate models for TX/RX mismatches. Specifically, it is possible to reduce a more elaborate model to the basic model in FIG. 2 by establishing equivalent carrier phases $\phi^b$ and $\phi^m$ from the many parameters of the more elaborate model.

From FIG. 2, the overall downlink channel $h^{dl}$, the overall uplink channel $h^{ul}$ and the wireless channel h between the base station antenna and the mobile user antenna are related as follows:

$$h^{dl} = e^{j(\phi^b - \phi^m)} h$$

$$h^{ul} = e^{j(\phi^m - \phi^b)} h \quad (1)$$

Note that for a narrowband signal or a channel with flat fading, h is a complex scalar. For a wideband signal under a frequency-selective channel, h, $\phi^b$, and $\phi^m$ can be functions of the frequency. From Eq. (1), the overall downlink channel $h^{dl}$ and the overall uplink channel $h^{ul}$ are related by $$h^{dl} = e^{j2(\phi^b - \phi^m)} h^{ul} = e^{j2\Delta\phi} h^{ul} \quad (2)$$

where $\Delta\phi = \phi^b - \phi^m$ is referred to as the carrier-phase difference (CPD). When the context is clear, the overall downlink channel and the overall uplink channel will hereinafter be referred to simply as the downlink channel and uplink channel, respectively.

Eqs. (1) and (2) can be extended to the multipoint-broadcast set in FIG. 1 as follows. For downlink channel:

$$\begin{bmatrix} h^{dl}_{11} & h^{dl}_{12} & h^{dl}_{13} \\ h^{dl}_{21} & h^{dl}_{22} & h^{dl}_{23} \\ h^{dl}_{31} & h^{dl}_{32} & h^{dl}_{33} \end{bmatrix} = \begin{bmatrix} e^{-j\phi^m_1} & 0 & 0 \\ 0 & e^{-j\phi^m_2} & 0 \\ 0 & 0 & e^{-j\phi^m_3} \end{bmatrix} \begin{bmatrix} h_{11} & h_{12} & h_{13} \\ h_{21} & h_{22} & h_{23} \\ h_{31} & h_{32} & h_{33} \end{bmatrix} \quad (3)$$

$$\begin{bmatrix} e^{j\phi^b_1} & 0 & 0 \\ 0 & e^{j\phi^b_2} & 0 \\ 0 & 0 & e^{j\phi^b_3} \end{bmatrix}$$

$$= \begin{bmatrix} h_{11} e^{j(\phi^b_1 - \phi^m_1)} & h_{12} e^{j(\phi^b_2 - \phi^m_1)} & h_{13} e^{j(\phi^b_3 - \phi^m_1)} \\ h_{21} e^{j(\phi^b_1 - \phi^m_2)} & h_{22} e^{j(\phi^b_2 - \phi^m_2)} & h_{23} e^{j(\phi^b_3 - \phi^m_2)} \\ h_{31} e^{j(\phi^b_1 - \phi^m_3)} & h_{32} e^{j(\phi^b_2 - \phi^m_3)} & h_{33} e^{j(\phi^b_3 - \phi^m_3)} \end{bmatrix}$$

And for uplink channel:

$$\begin{bmatrix} h^{ul}_{11} & h^{ul}_{12} & h^{ul}_{13} \\ h^{ul}_{21} & h^{ul}_{22} & h^{ul}_{23} \\ h^{ul}_{31} & h^{ul}_{32} & h^{ul}_{33} \end{bmatrix} = \begin{bmatrix} e^{-j\phi^b_1} & 0 & 0 \\ 0 & e^{-j\phi^b_2} & 0 \\ 0 & 0 & e^{-j\phi^b_3} \end{bmatrix} \begin{bmatrix} h_{11} & h_{21} & h_{31} \\ h_{12} & h_{22} & h_{32} \\ h_{13} & h_{23} & h_{33} \end{bmatrix} \quad (4)$$

$$\begin{bmatrix} e^{j\phi^m_1} & 0 & 0 \\ 0 & e^{j\phi^m_2} & 0 \\ 0 & 0 & e^{j\phi^m_3} \end{bmatrix}$$

-continued $$= \begin{bmatrix} h_{11}e^{j(\phi_1^m - \phi_1^b)} & h_{21}e^{j(\phi_2^m - \phi_1^b)} & h_{31}e^{j(\phi_3^m - \phi_1^b)} \\ h_{12}e^{j(\phi_1^m - \phi_2^b)} & h_{22}e^{j(\phi_2^m - \phi_2^b)} & h_{32}e^{j(\phi_3^m - \phi_2^b)} \\ h_{13}e^{j(\phi_1^m - \phi_3^b)} & h_{23}e^{j(\phi_2^m - \phi_3^b)} & h_{33}e^{j(\phi_3^m - \phi_3^b)} \end{bmatrix}$$

The downlink channel and the uplink channel are related by $$h_{ji}^{dl} = h_{ij}^{ul} e^{j2(\phi_i^b - \phi_j^m)} = h_{ij}^{ul} e^{j2\Delta\phi_{ij}} \quad (5)$$

where $\Delta\phi_{ij} = \phi_i^b - \phi_j^m$ is the CPD between base station i and mobile user j, $h_{ji}^{dl}$ is the over-all downlink channel from base station i to mobile user j, $h_{ji}$ is the wireless channel between the antenna of base station i and the antenna of mobile user j, and $h_{ij}^{ul}$ is the overall uplink channel from mobile user j to base station i. Note that Eqs. (3), (4), and (5) assume single antenna at each base station and mobile user. It is straightforward to extend Eqs. (3), (4), and (5) to include the general case of arbitrary number of antennas at each base station, arbitrary number of antennas at each mobile user, arbitrary number of base stations, and arbitrary number of mobile users.

From Eqs. (3), (4), and (5), it can be seen that base stations can obtain the downlink-channel information from the uplink-channel information and the CPDs. To this end, the base stations can acquire the uplink-channel information via uplink pilots, and acquire the CPDs by downlink-channel phase feedback from mobile users. This approach to acquiring the downlink-channel information, however, has following drawbacks:

1. For each multipoint-broadcast session, the CPDs have to be acquired first. This creates the CPD-acquisition overhead in time domain and reduces the network capacity.
2. The downlink-channel acquisition depends on the set of mobile users in a multipoint-broadcast session. A new multipoint-broadcast session with a different set of mobile users requires a new CPD acquisition, which further increases the CPD-acquisition overhead in time domain. If several multipoint-broadcast sessions are interleaved in time, i.e., time-multiplexed, this will increase the CPD acquisition overhead in time domain still further.
3. The CPD acquisition requires the feedback from all mobile users in a multipoint-broadcast session. As the number of mobile users in a multipoint-broadcast session increases, the demand on resources such as signaling or data channels for feedback also increases, which increases the feedback overhead, and/or the CPD-acquisition overhead in resource domain. The overhead in resource domain includes pilot sub-carriers in an OFDM (orthogonal frequency division multiple access) system, pilot code-channels in a CDMA (code-division multiple access) system, and data channels for feedback. Consequently the capacity of the network is reduced.

The above drawbacks can result in large aggregated CPD-acquisition overhead and reduce the benefit of multipoint broadcasting.

SUMMARY

The following presents a summary of one or more aspects in order to provide a basic understanding of such aspects. The summary is intended to be neither an extensive overview of all contemplated aspects nor a delineation of the scope of any or all aspects. The purpose of the summary is to present some concepts of one or more aspects in a simplified form as a prelude to the more detailed descriptions that are presented later.

The subject disclosure provides for improved downlink-channel acquisition by a set of base stations in a wireless network employing multipoint broadcasting. The complete downlink-channel information can be acquired from the uplink-channel information and all CPDs between the base stations and the mobile users under consideration. In multipoint broadcasting, however, it is not necessary for the base station to acquire the complete downlink-channel information. This makes it possible for base stations to not rely on all mobile users for downlink-channel feedback in a multipoint-broadcast session.

In some aspects of the subject disclosure, the base-station set in a multipoint-broadcast session relies on only one mobile user for downlink-channel phase feedback. The base-station set uses the feedback from the mobile user to detect the CPDs, and then uses the detected CPDs to achieve phase synchronization in the sense that each base station in the set has the knowledge of the relative phases between any base-station pair in the base-station set. Such knowledge, together with the pilots in downlink transmissions as phase references for mobile users, is sufficient for the base stations to determine the pre-coding matrix for multipoint broadcasting. As a result, the feedback overhead in resource domain is greatly reduced.

In one or more aspects, methods are provided for improving the phase synchronization accuracy. A base-station set can choose more than one mobile user for downlink-channel phase feedback, where the additional information from more phase-feedback mobile users can be used to reduce the phase estimation noise. Consequently, improved multipoint broadcasting performance can be expected, since critical performance measures, such as data throughput, bit error rate, and block error rate, are more sensitive to the phase errors than to gain mismatches.

In still other aspects, methods are provided for making downlink-channel phase feedback and phase-synchronization of base stations independent of multipoint-broadcast sessions. A mobile user for downlink-channel phase feedback may or may not belong to the mobile-user set in a multipoint-broadcast session. Likewise, base stations receiving the downlink-channel feedback may or may not form a base-station set in a multipoint-broadcast session. The feedback connections between base stations and mobile users can be dynamically switched based on various criteria such as link quality, distances between mobile users and neighbor base stations, etc. This enables base stations in a wireless network to maintain phase synchronization as long as there are mobile users available, thus providing the flexibility for base stations to form a multipoint-broadcast set and to start a multipoint-broadcast session at any time without the need for session-dependent CPD acquisition and/or phase synchronization. This will significantly reduce the synchronization overhead, and will be particularly beneficial for interleaved multipoint-broadcast sessions where the several base-station sets and mobile-user sets simultaneously exist. The multipoint sessions can be interleaved either in time (in a time-multiplexing manner), or in frequency (e.g., in disjoint subcarrier sets in an LTE-A system), or in some other dimension (e.g., in disjoint code channel sets in a CDMA system).

In yet other aspects, methods are provided to phase-sync base stations more efficiently with wide-bandwidth signals. For wideband signals, the relative phase between two base stations can vary with the frequency. Proper modeling of the CPDs and the relative phases allows the CPDs and relative phases to be determined with a very limited downlink-channel phase feedback, and avoids full downlink-channel phase feedback over the entire signal bandwidth that incurs an overwhelmingly large feedback overhead.

DETAILED DESCRIPTION

The disclosed subject matter will now be described more fully hereinafter with reference to the accompanying drawings, in which some, but not all aspects or embodiments, are shown with like numerals referring to like elements throughout the description. Various aspects may be embodied in many different forms and should not be construed as limited to the embodiments set forth herein. Specific details are described for the purpose of providing a thorough understanding of the subject innovation. It may be evident, however, that the disclosed subject matter may be practiced without these specific details. In other instances, well-known methods, procedures, and components have not been described in detail so as not to obscure the subject innovation.

Various terms are used to describe counterparts that are communicating with each other in various communications networks. For example, in a wireless cellular network, "base station" and "mobile user" are used. More generic terms, "reference device" and "non-reference device" are used in more general descriptions. The distinction between a reference device and a non-reference device is that a non-reference device can derive the desired information, e.g., the CPD and/or the relative phase, from the signals or data sent from the reference device. In the context of the phase synchronization, a base station is a non-reference device, and a mobile user is a reference device. Accordingly, the channel from a non-reference device to a reference device is referred to as the "downlink" channel, and the channel from a reference device to a non-reference device is referred to as the "uplink" channel.

Phase Synchronization of Base Stations with Mobile User Feedback

Figure 1:
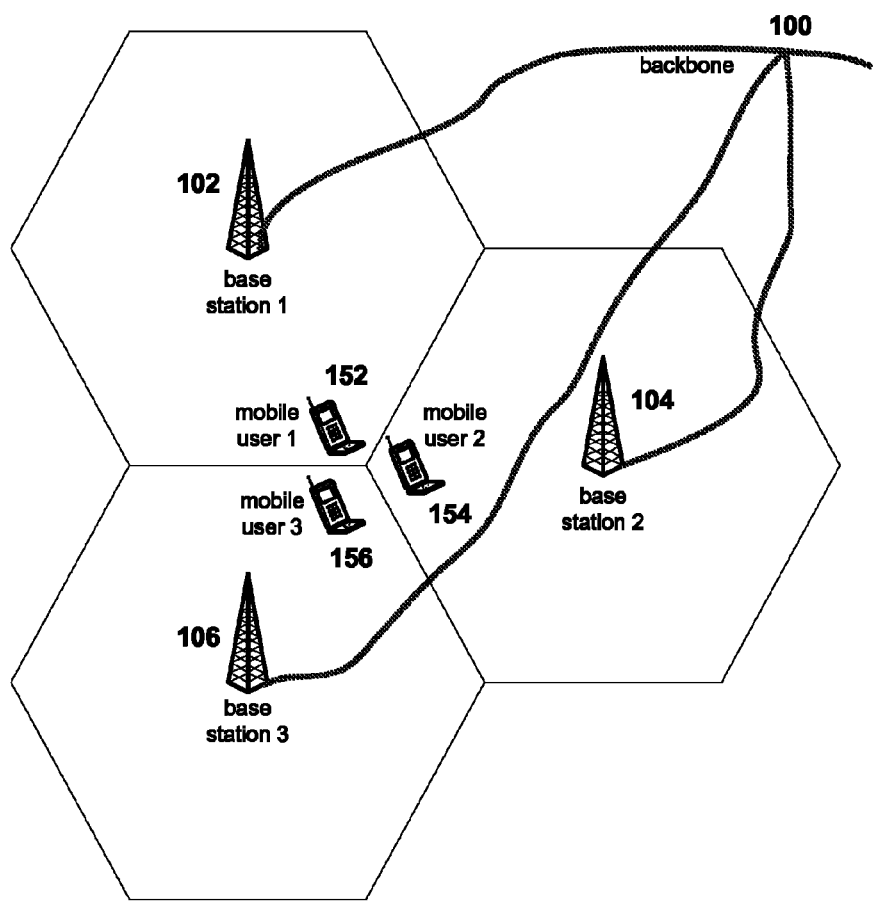
FIG. 1 illustrates a wireless cellular network that comprises a multipoint-broadcast set.
Figure 2:
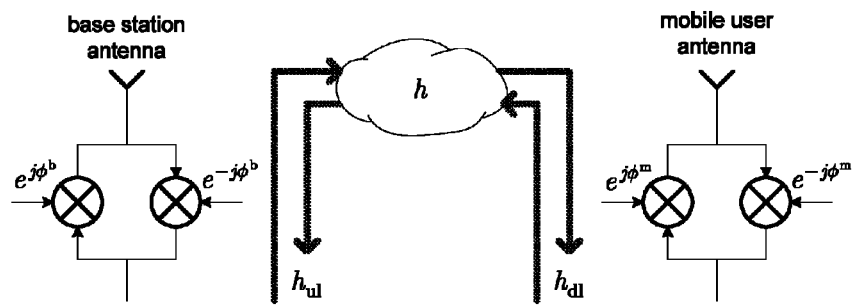
FIG. 2 illustrates a basic model for channel non-reciprocity.

The downlink channel for the multipoint-broadcast set in FIG. 1 can be decomposed as follows. From Eqs. (3), (4), and (5), $$H^{dl} = \begin{bmatrix} h_{11}^{dl} & h_{12}^{dl} & h_{13}^{dl} \\ h_{21}^{dl} & h_{22}^{dl} & h_{23}^{dl} \\ h_{31}^{dl} & h_{32}^{dl} & h_{33}^{dl} \end{bmatrix} \quad (6)$$

$$= \begin{bmatrix} e^{-j2\phi_1^m} & 0 & 0 \\ 0 & e^{-j2\phi_2^m} & 0 \\ 0 & 0 & e^{-j2\phi_3^m} \end{bmatrix} \begin{bmatrix} h_{11}^{ul} & h_{21}^{ul} & h_{31}^{ul} \\ h_{12}^{ul} & h_{22}^{ul} & h_{32}^{ul} \\ h_{13}^{ul} & h_{23}^{ul} & h_{33}^{ul} \end{bmatrix}$$

$$\begin{bmatrix} e^{j2\phi_1^b} & 0 & 0 \\ 0 & e^{j2\phi_2^b} & 0 \\ 0 & 0 & e^{j2\phi_3^b} \end{bmatrix}$$

$$= \begin{bmatrix} e^{j2(\phi_1^b - \phi_1^m)} & 0 & 0 \\ 0 & e^{2j(\phi_1^b - \phi_2^m)} & 0 \\ 0 & 0 & e^{2j(\phi_1^b - \phi_3^m)} \end{bmatrix} \begin{bmatrix} h_{11}^{ul} & h_{21}^{ul} & h_{31}^{ul} \\ h_{12}^{ul} & h_{22}^{ul} & h_{32}^{ul} \\ h_{13}^{ul} & h_{23}^{ul} & h_{33}^{ul} \end{bmatrix}$$

$$\begin{bmatrix} 1 & 0 & 0 \\ 0 & e^{2j(\phi_2^b - \phi_1^b)} & 0 \\ 0 & 0 & e^{2j(\phi_3^b - \phi_1^b)} \end{bmatrix}$$

$$= P_m H_{partial}^{dl}$$

where $$P_m = \begin{bmatrix} e^{j2(\phi_1^b - \phi_1^m)} & 0 & 0 \\ 0 & e^{j2(\phi_1^b - \phi_2^m)} & 0 \\ 0 & 0 & e^{j2(\phi_1^b - \phi_3^m)} \end{bmatrix}$$

$$H_{partial}^{dl} = \begin{bmatrix} h_{11}^{ul} & h_{21}^{ul} & h_{31}^{ul} \\ h_{12}^{ul} & h_{22}^{ul} & h_{32}^{ul} \\ h_{13}^{ul} & h_{23}^{ul} & h_{33}^{ul} \end{bmatrix} \begin{bmatrix} 1 & 0 & 0 \\ 0 & e^{j2(\phi_2^b - \phi_1^b)} & 0 \\ 0 & 0 & e^{j2(\phi_3^b - \phi_1^b)} \end{bmatrix} = (H^{ul})^T P_b \quad (7)$$

While the full knowledge $H^{dl}$ of the downlink channel ensures the base stations to perform the pre-coding for multipoint broadcasting, in practice the partial information $H_{partial}^{dl}$ a the downlink channel is sufficient. The partial downlink-channel information $H_{partial}^{dl}$ does not contain the carrier-phase information of the mobile users, as indicated in Eqs. (6) and (7), but the lack of such knowledge can be compensated by the fact that a downlink channel always contains pilot signals from which mobile users can detect the missing channel phase, represented by diagonal matrix $P_m$. For example, if the base-station set uses $H_{partial}^{dl}$ instead of $H^{dl}$ to compute the pre-coding matrix via one of the following methods: zero-forcing (ZF), minimum-mean square error (MMSE), and Tomlinson-Harashima pre-coding (THP), the signal arriving at mobile user j has a phase rotation of $e^{2j(\phi_1^b - \phi_j^m)}$, which can be detected from the pilot channels in the received downlink signal and then compensated in the subsequent data demodulation.

It can be seen from Eq. (7) that the partial downlink channel $H_{partial}^{dl}$ requires the knowledge of the uplink channel and relative phases between the base stations. For example, the phase of base station i relative to base station 1 is $\phi_i^b - \phi_1^b$. As mentioned earlier, the base stations are considered to be phase-synchronized if the relative phases between base stations have been acquired.

The relative phases between base stations can be obtained as follows. Assuming that mobile user j is chosen for downlink-channel phase feedback. Mobile user j is then referred to as "phase-feedback mobile user". From the downlink-channel phase feedback, base station i is able to compute the estimate $\hat{\Delta}_{ij}$ of CPD $\Delta_{ij}=\phi_i^b-\phi_j^m$, depending on the types of feedback that will be described later. The CPD estimates, along with the uplink-channel information, can be exchanged between the base stations via the high-speed backbone, as shown in FIG. 1. Note that $$\Delta_{ij}-\Delta_{1j}=\phi_i^b-\phi_1^b \quad (8)$$

each base station is then able to compute the estimate of the relative phase from the CPD estimates:

$$\phi_i^b-\phi_1^b \approx \hat{\Delta}_{ij}-\hat{\Delta}_{1j} \quad (9)$$

From Eq. (8) the base stations are phase-synchronized and the entries in $P_b$ can be readily calculated.

In the above example, base station 1 is used as the "phase reference" in the sense that its corresponding entry in $P_b$ is one. It should be noted, however, that any base station in the base-station set of the multipoint-broadcast session can be used as the phase reference, and any mobile user can be chosen for downlink-phase feedback. Further, the entry of the phase-reference base station in $P_b$ can be a phasor with an arbitrary phase, not necessarily one. For example, $P_b$ may have a more general form $$P_b = \begin{bmatrix} e^{j\varphi} & 0 & 0 \\ 0 & e^{j[\varphi+2(\phi_2^b-\phi_1^b)]} & 0 \\ 0 & 0 & e^{j[\varphi+2(\phi_3^b-\phi_1^b)]} \end{bmatrix} \quad (10)$$

with base station 1 being the phase reference. It is also to be appreciated that Eqs (6) and (7) can be expanded to include any number of base stations, any number of mobile users, and any number of antennas in each base station and each mobile user.

Since the base-station set in a multipoint-broadcast session can be phase-synchronized by only one phase-feedback mobile user, the feedback overhead is greatly reduced. For example, if a multipoint-broadcast session comprises four mobile users, complete CPD detection requires four times feedback overhead as much as what phase synchronization of the base-station set requires.

Figure 3:
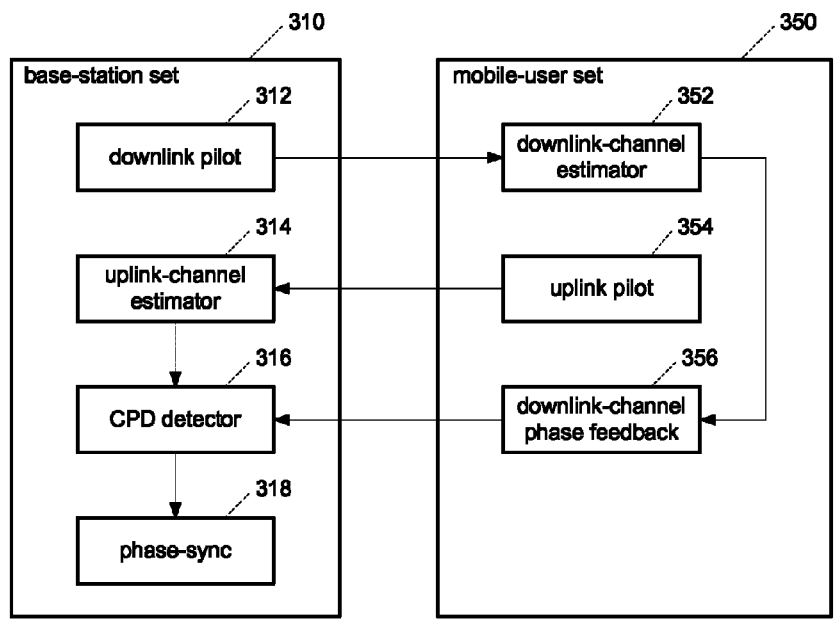
FIG. 3 illustrates an example multipoint-broadcast system that phase-synchronizes the base stations in the base-station set.

FIG. 3 illustrates an example multipoint-broadcast system that phase-synchronizes the base stations in the base-station set according to the descriptions above. Base-station set 310 comprises downlink pilot apparatus 312, uplink-channel estimator 314, CPD detector 316, and phase-sync apparatus 318. Mobile-user set 350 comprises downlink-channel estimator 352, uplink pilot apparatus 354, and downlink-channel phase feedback apparatus 356. One or more mobile users in mobile-user set can be chosen to be phase-feedback mobile user(s) prior to the following operations. Downlink pilot apparatus 312 sends the downlink pilot signal to mobile-user set 350. Downlink-channel estimator 352 estimates the downlink channel. Uplink pilot apparatus 354 sends an uplink pilot signal to base-station set 310. Uplink-channel estimator 314 estimates the uplink channel. Downlink-channel phase feedback apparatus 356 sends the downlink-channel phase information from the phase-feedback mobile user(s) to base-station set 310. CPD detector 316 in base-station set 310 uses the downlink-channel phase to estimate the CPDs between the phase-feedback mobile user and all base stations in base-station set 310. Phase-sync apparatus 318 calculates the relative phases between base stations according to Eq. (9) for phase synchronization. The downlink-channel phase information from the downlink-channel estimate can be quantized, compressed, error-control coded, and fed back to base-station set 310 via an uplink data channel. Such a feedback mechanism is referred to as digitized feedback. The base-station can compute the CPDs $\Delta_{ij}=\phi_i^b-\phi_j^m$ from the downlink-channel phase, derived from the downlink-channel phase information sent from the phase-feedback mobile user(s), and from uplink-channel $h_{ij}^{ul}$ according to Eq. (5). Uplink channel $h_{ij}^{ul}$ can be estimated using an uplink pilot. To distinguish from the "special uplink pilot" to be described momentarily, the uplink pilot used for uplink-channel estimation is referred to as "standard uplink pilot".

Alternatively, the downlink-channel phase can also be fed back via a signaling protocol. A signaling protocol embeds the downlink-channel phase information into a special uplink pilot. For example, the special uplink pilot from mobile user j to base station i can be chosen to be $$P_{special,ij}^{ul}=e^{-j\angle h_{ji}^{dl}} \quad (11)$$

where $\angle h_{ji}^{dl}$ is the phase of the downlink channel between base station i and mobile user j. At base station i, the phase of the received special uplink pilot is $$\angle h_{ij}^{ul}-\angle h_{ji}^{dl}=-2\Delta_{ij} \quad (12)$$

from which the CPD $\Delta_{ij}$ can be readily obtained. It should be noted that the uplink channel estimation is not needed for determining the CPD when the downlink-channel phase is sent via a special pilot. If a phase-feedback mobile user has N phase-feedback links to N base stations, the phase-feedback mobile user needs to send N special pilots.

It is to be appreciated that phase-feedback mobile users can feed any functions of downlink-channel phases back that assist base stations to estimate the CPD.

The accuracy of phase synchronization can be improved by using more than one phase-feedback mobile user. Consider the multipoint-broadcast set in FIG. 1, where mobile users 1 and 2 are feeding back the downlink-channel phase to base stations 1 and 2. Two estimates of the relative phase between base stations 2 and 1 are available:

$$\phi_2^b-\phi_1^b \approx \hat{\Delta}_{21}-\hat{\Delta}_{11}$$

$$\phi_2^b-\phi_1^b \approx \hat{\Delta}_{22}-\hat{\Delta}_{12} \quad (13)$$

The relative-phase estimate can be improved by weight-averaging the two individual estimates:

$$\phi_2^b-\phi_1^b \approx a_1(\hat{\Delta}_{21}-\hat{\Delta}_{11})+a_2(\hat{\Delta}_{22}-\hat{\Delta}_{12}), a_1+a_2=1 \quad (14)$$

where $a_1$ and $a_2$ may depend on the quality of the individual estimates. Eq. (14) can be extended to more than two individual relative-phase estimates, and other means that yield a new relative-phase estimate from a plurality of individual relative-phase estimates can also be used to improve the estimation quality.

In some situations, it is the phasor form $\Phi_{ij}=e^{j\Delta_{ij}}$ of the CPD $\Delta_{ij}$ that is estimated. There are also situations where the phasor form of the relative phase is desired. In the above example, two individual phasor estimates can be obtained as $$e^{j(\phi_2^b-\phi_1^b)} \approx \hat{\Phi}_{21}\hat{\Phi}_{11}^*$$

$$e^{j(\phi_2^b-\phi_1^b)} \approx \hat{\Phi}_{22}\hat{\Phi}_{21}^* \quad (15)$$

A new phasor estimate can be obtained as $$e^{j(\phi_2^b-\phi_1^b)} \approx a_1(\hat{\Phi}_{21}\hat{\Phi}_{11}^*)+a_2(\hat{\Phi}_{22}\hat{\Phi}_{21}^*), a_1+a_2=1 \quad (16)$$

Eq. (16) can be extended to more than two individual phasor estimates, and other means that yield a new phasor estimate from a plurality of individual phasor estimates can also be used.

Session-Independent Phase Synchronization

CPD acquisition and phase synchronization are typically performed as the tasks of the downlink-channel acquisition of a multipoint-broadcast session. This makes phase synchronization of base stations part of the multipoint-broadcast session, thus it has to be performed in every multipoint-broadcast session, which increases synchronization overhead and reduces the network capacity.

Figure 4:
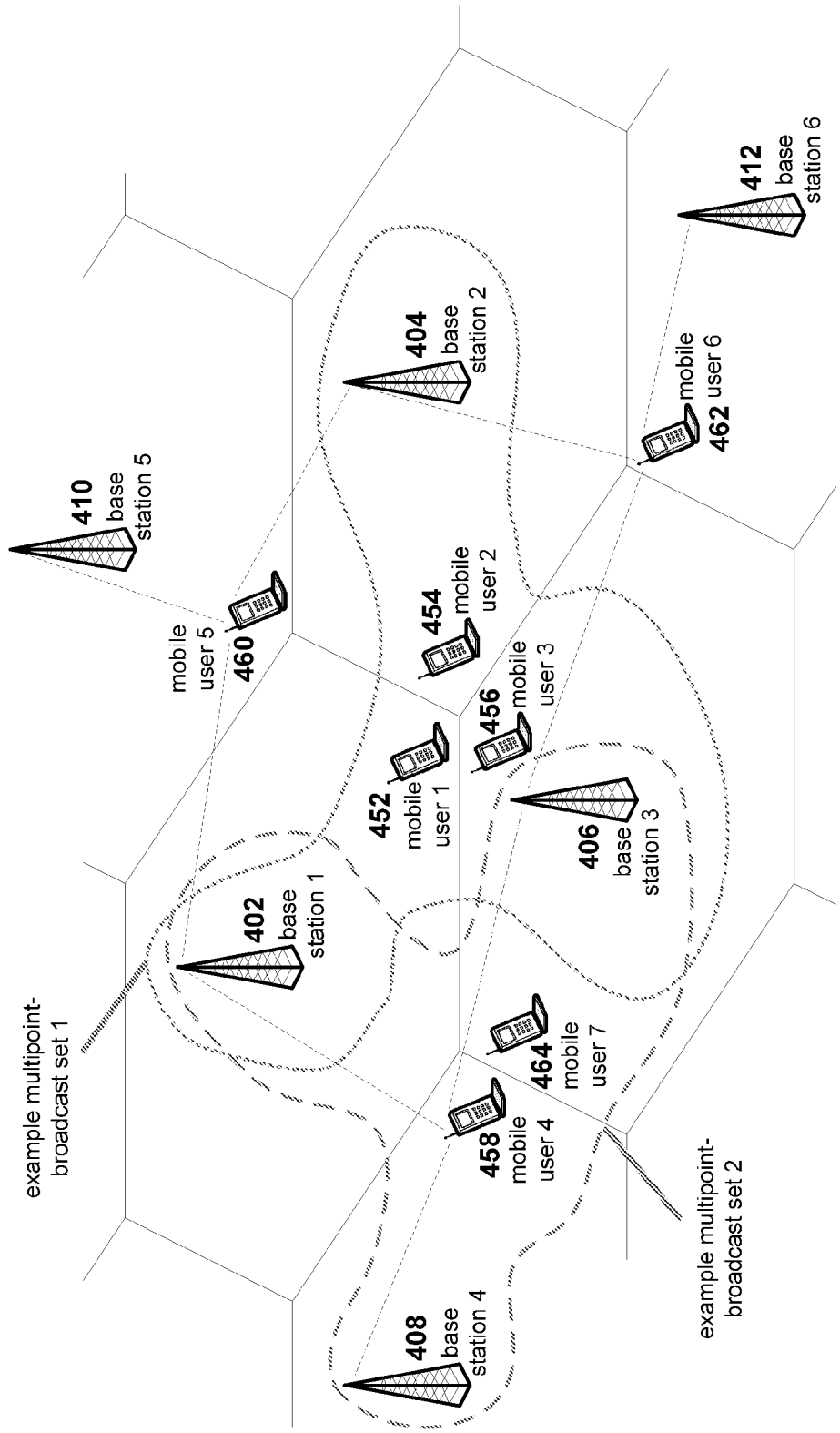
FIG. 4 illustrates an exemplary session-independent phase-synchronization strategy in a wireless cellular network.

FIG. 4 illustrates an exemplary session-independent phase-synchronization strategy in a wireless cellular network where phase synchronization of base stations is made independent of multipoint-broadcast sessions. Elements 402, 404, 406, 408, 410, and 412 denote base stations 1, 2, 3, 4, 5, and 6 respectively, and elements 452, 454, 456, 458, 460, 462, and 464 denote mobile users 1, 2, 3, 4, 5, 6, and 7 respectively. Mobile users 4, 5, and 6 are chosen for downlink-channel phase feedback. Mobile user 4 sends the downlink-channel phase information to base stations 1, 3, and 4, from which relative phases $\phi_3^b - \phi_1^b$, $\phi_4^b - \phi_1^b$, and $\phi_4^b - \phi_3^b$ can be estimated. Mobile user 5 sends the downlink-channel phase information to base stations 1, 2, and 5, from which relative phases $\phi_2^b - \phi_1^b$, $\phi_5^b - \phi_1^b$, and $\phi_5^b - \phi_2^b$ can be estimated. Mobile user 6 sends the downlink-channel phase information to base stations 2, 3, and 6, from which relative phases $\phi_3^b - \phi_2^b$, $\phi_6^b - \phi_2^b$, and $\phi_6^b - \phi_3^b$ can be estimated. Base stations 1, 2, 3, 4, 5, and 6 estimate 9 relative phases in total, including 5 independent relative phases from which all ($_2^6$)=30 relative phases can be derived. Therefore the feedback arrangement in FIG. 4 allows all 6 base stations to be phase-synchronized. Generally, if a network or a base-station set has N base stations, there are N-1 independent relative phases, the knowledge of which enables the phase synchronization of all N base stations.

In the phase-synchronization strategy in FIG. 4, any two base stations can be phase-synchronized directly if they receive the downlink-channel phase feedback from the same mobile user(s). For example, both base stations 1 and 3 receive feedback from mobile user 4. From the downlink-channel phases, base station 1 computes CPD $\Delta_{14}$ and base station 3 computes CPD $\Delta_{34}$. Then relative phase $\phi_3^b - \phi_1^b$ can be computed as $\phi_3^b - \phi_1^b \Delta_{34} - \Delta_{14}$.

If a pair of base stations does not have a common phase-feedback mobile user, the two base stations may still be phase-synchronized indirectly. In FIG. 4 for example, base stations 4 and 6 do not have a common phase-feedback mobile user. However, base stations 3 and 4 can be directly phase-synchronized with mobile user 4, and base stations 3 and 6 can be directly phase-synchronized with mobile user 6, therefore relative phases $\phi_4^b - \phi_3^b$ and $\phi_6^b - \phi_3^b$ are available. Then the relative phase $\phi_6^b - \phi_4^b$ between base stations 6 and 4 can be computed to be $\phi_6^b - \phi_4^b = (\phi_6^b - \phi_3^b) - (\phi_4^b - \phi_3^b)$, and phase synchronization between base stations 4 and 6 is achieved.

Figure 5:
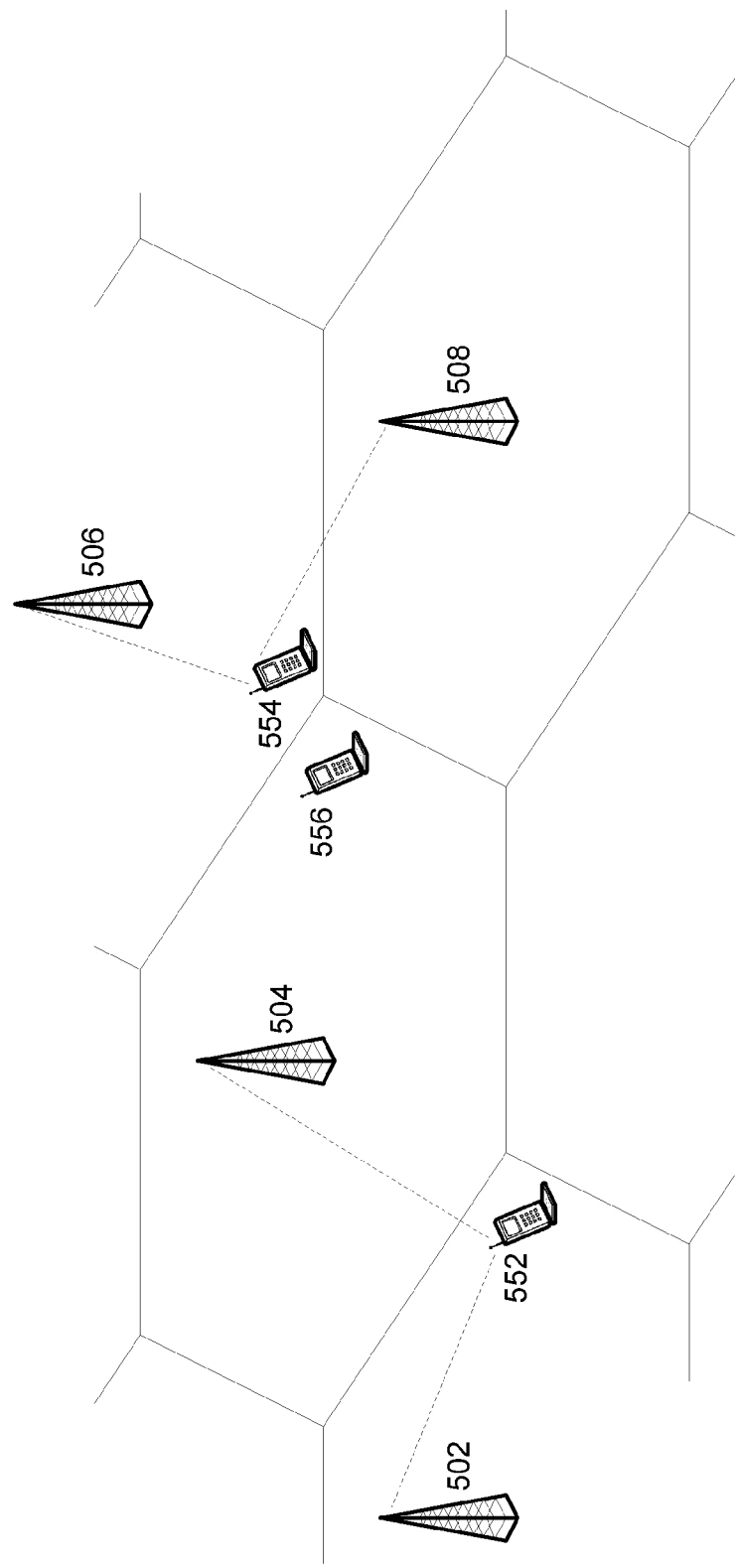
FIG. 5 illustrates examples of phase-synchronizable set.

All base stations 1, 2, 3, 4, 5, and 6 in FIG. 4 can be phase-synchronized by phase-feedback mobile users 4, 5, and 6. Accordingly, base stations 1, 2, 3, 4, 5, and 6, and mobile users 1, 2, 3, 4, 5, and 6 are said to form a phase-synchronizable set. A phase-synchronizable set may or may not include non-phase-feedback mobile users, such as mobile users 1, 2, and 3 in FIG. 4, the key is that the phase-feedback links between phase-feedback mobile users and base stations allow all base stations in the set to phase-synchronize. In other words, in a phase-synchronizable set with N base stations, the phase-feedback links should allow N-1 independent relative phases to be detected. FIG. 5 shows more examples of phase-synchronizable set. Base stations 502 and 504 and mobile user 552 form a phase-synchronizable set. Base stations 506 and 508 and mobile users 554 and 556 also form a phase-synchronizable set. However the set consisting of base stations 502, 504, 506, and 508, and mobile users 552, 554 and 556 is not phase-synchronizable, since, for example, base stations 504 and 506 are not able to phase-synchronize, directly or indirectly, due to the lack of proper phase-feedback links.

One advantage of the phase-synchronization strategy in FIG. 4 is that phase-synchronization can be made to be independent of mobile-users in a multipoint-broadcast session. FIG. 4 shows two example multipoint-broadcast sets. Example multipoint-broadcast set 1 comprises base stations 1, 2, and 3, and mobile users 1, 2, and 3. Example multipoint-broadcast set 2 comprises base stations 1, 3, and 4, and mobile users 4 and 7. It can be seen that the phase-feedback mobile users are not necessarily the same as the mobile users in a multipoint-broadcast session. This provides the network the flexibility of assigning phase-feedback mobile users based on channel conditions, feedback quality, mobile-user availability, etc.

Another advantage of the session-independent phase-synchronization strategy in FIG. 4 is that phase-synchronization can be made to be independent of multipoint-broadcast sessions, which can eliminate or reduce the time for session-specific synchronizations, thus reducing the synchronization overhead significantly. Consider example multipoint-broadcast set 1 in FIG. 4. If the base stations 1, 2, 3, 4, 5, and 6 are phase-synchronized, there is no need for base stations 1, 2, and 3 to phase-synchronize again for the multipoint-broadcast session for example multipoint-broadcast set 1. As another example, consider two multipoint-broadcast sessions as indicated by the two example multipoint-broadcast sets in FIG. 4. If the two multipoint-broadcast sessions are interleaved in time, the two sessions are then switched back and forth frequently. Without session-independent phase-synchronization of the base stations, CPD acquisition and phase-synchronization have to be performed upon every switching, thus the phase-synchronization overhead can be much higher in interleaved multipoint-broadcast sessions than in standalone multipoint-broadcast sessions. With the session-independent phase-synchronization strategy in FIG. 4, the phase-synchronization overhead in time-interleaved multipoint broadcasting can be completely eliminated. This is highly desired since interleaved multipoint broadcasting provides faster scheduling, better link adaptation, and more efficient resource utilization, than its standalone counterpart.

Other types of interleaved multipoint broadcasting also benefit from the session-independent phase synchronization. For example, frequency-interleaved multipoint broadcasting allocates different subcarriers to different sessions. Session-independent phase synchronization eliminates the need for each session to achieve phase synchronization and to maintain its own phase tracking.

Session-independent phase synchronization makes it possible for base stations to be "ready" for multipoint broadcasting at any time. Any mobile user that connects to multiple base stations can be assigned for downlink-channel phase feedback, thus phase-synchronizing the base stations it connects to.

It is to be understood that more than one mobile user can be used to feed the downlink-channel phases back to the same set of base stations to improve the phase-synchronization accuracy. The session-independent phase-synchronization strategy in FIG. 4 can be extended to more base stations or all base stations in a wireless cellular network.

Phase Synchronization with Model-Based Downlink-Channel Phase Feedback

Wireless cellular networks occupy wider and wider bandwidth for increased capacity. In a wide bandwidth, the CPDs as well as the relative phases can be a function of the frequency. For example, in an LTE network, the relative phase between two base stations on one subcarrier can be different from the relative phase between the same two base stations on a different subcarrier. To acquire the relative phase, the downlink-channel phases over the entire signal bandwidth need to be made available at base stations. To transmit information on all downlink-channel phases back to base stations will not be practical since the feedback overhead will be too high.

Generally, the CPD between two communications devices are caused by phase difference in oscillators and delay difference in transmit (TX) and receive (RX) chains. The phase difference in oscillators is generally considered to be the same across the entire signal bandwidth, whereas the delay difference in TX and RX chains causes the phase change that is proportional to the signal frequency. Thus the CPD $\Delta_{ij}$ between base station i and mobile user j can be modeled as a linear function of the frequency within the signal bandwidth:

$$\Delta_{ij} = \beta_{ij} + \alpha_{ij} f \qquad (17)$$

From Eq. (17), only two parameters, namely, $\alpha_{ij}$ and $\beta_{ij}$, are needed to determine the CPD $\Delta_{ij}$ over the entire signal bandwidth. Consequently only two downlink-channel phases are needed to determine the CPD $\Delta_{ij}$. In contrast, well above one hundred downlink-channel phases may be needed over the entire signal bandwidth in an LTE network. Thus using CPD models such as in Eq. (17) reduces the feedback overhead to a very small fraction of what is needed without any CPD modeling. While two downlink-channel phases allows the CPD acquisition over the entire signal bandwidth, more than two downlink-channel phases can be fed back to improve the estimation accuracy of parameters $\alpha_{ij}$ and $\beta_{ij}$.

If mobile user j is also transmitting the downlink-channel phases to base station k using the same efficient feedback employing the linear CPD model, the CPD $\Delta_{kj}$ can be obtained similarly over the entire signal bandwidth. From the estimated CPD values of $\Delta_{ij}$ and $\Delta_{kj}$, the phase of base station k relative base station i can be computed to be $$\phi_k^b - \phi_i^b = \Delta_{kj} - \Delta_{ij} \qquad (18)$$

so that base stations i and k achieve phase synchronization. It can be seen from Eq. (18) that if the CPD is a linear function in frequency, so is the relative phase:

$$\phi_k^b - \phi_i^b = \Delta_{kj} - \Delta_{ij} = (\beta_{kj} - \beta_{ij}) + (\alpha_{kj} - \alpha_{ij})f = b_{ki} + \alpha_{ki} f \qquad (19)$$

It should be noted that even though the relative phase $\phi_k^b - \phi_i^b$ is computed with the help of mobile user j, the parameters $a_{ki}$ and $b_{ki}$ in the model of the relative phase $\phi_k^b - \phi_i^b$ only depend on base stations i and k, and are independent of mobile user j.

The parameter $b_{ki}$ in Eq. (19) reflects the phase mismatch between the two oscillators and the phase noises. The parameter $a_{ki}$ depends on the delay mismatches in TX/RX chains between the two base stations. $a_{ki}$ is considered to be fixed or slow-varying relative to $b_{ki}$, so it can be calibrated and stored at base stations prior to a multipoint-broadcast session, and updated less frequently, if needed. This leaves the parameter $b_{ki}$ to be the only one that needs to be estimated on a regular basis, which means that a mobile user needs to feed only one downlink-channel phase back to each base station on a regular basis, further reducing the feedback overhand. If the mobile user transmits more than one downlink-channel phase to each base station, the estimation accuracy for $b_{ki}$ can be improved if $a_{ki}$ is considered to be known. Various algorithms are available with various optimization criteria for estimating parameters $a_{ki}$ and $b_{ki}$, or for estimating parameter $b_{ki}$ when parameter $a_{ki}$ is assumed to be known, from a plurality of downlink-channel phases, or from a plurality of CPD values, at different frequencies.

If the fixed or slow-varying component of the relative phase includes a nonlinear function in frequency, the nonlinearity can also be calibrated and stored at base stations prior to a multipoint-broadcast session, and updated less frequently, if needed.

The calibration of the fixed or slow-varying component of the relative phase can be done using the various aspects and/or embodiments described hereinabove. More feedback data and longer time for CPD and relative phase estimation may be needed in the calibration process to improve the calibration accuracy. Since calibration needs only to occur once or occasionally, the impact of higher feedback overhead and longer estimation time for calibration on network efficiency can be negligible.

The downlink-channel phase feedback strategy described above is referred to as model-based downlink-channel phase feedback. The models for the CPDs and/or the relative phases over the entire signal bandwidth include the linear model in Eqs. (17) and (19), decomposition model with fixed/slow-varying and. fast-changing components, decomposition model with linear and non-linear components, and models that are various combinations of linear and decomposition models.

CONCLUSION, RAMIFICATIONS, AND SCOPE

Accordingly it will be seen that phase synchronization of base stations provides necessary information for pre-coding in multipoint broadcasting while significantly reduces the feedback overhead compared with complete CPD acquisition between any base station and any mobile user in a multipoint-broadcast set. In multipoint broadcasting, it is not necessary for base stations to have the complete downlink-channel information, and only partial downlink-channel information is needed, which is made available by phase synchronization of base stations. At the minimum, one mobile user in the multipoint broadcast set is sufficient to phase-synchronize all base stations in the set by feeding back the downlink-channel phase information. In contrast, complete CPD acquisition requires feedback from all mobile users in the set.

The accuracy of the phase synchronization of base stations can be improved by having more than one mobile user feeding the downlink-channel phases to base stations.

Another significant advantage is that the phase synchronization of base stations can be made independent of multipoint-broadcast sessions so that synchronization overhead for each multipoint-broadcast session can be eliminated completely. Furthermore, session-independent phase-synchronization strategy allows all base stations in the network to be phase-synchronized all the time, enabling the network to schedule multipoint-broadcast sessions with any set of base stations and any set of mobile users at any time. Such flexibility makes interleaved multipoint broadcasting a reality and makes more efficient use of the network resources, further improving the network capacity.

Phase synchronization of base stations can be economically implemented by model-based downlink-channel phase feedback over the entire signal bandwidth. By employing the linear property of the CPD and the relative phases, the mobile users need to transmit only a very limited number of downlink-channel phases. By pre-calibrating the fixed or slow-varying component of the relative phases and store the results at the base stations, the number of required downlink-channel phases can be as low as one per base-station-mobile-user link. Pre-calibration can also include nonlinear fixed or slow-varying component, making phase synchronization of base stations feasible for practically all TX/RX characteristics.

It is to be appreciated that claimed subject matter herein is not limited to wireless cellular networks. It can be applied to rather general wireless communications systems comprising a plurality of non-reference devices and a plurality of reference devices with some of the reference devices being feedback reference devices, where non-reference devices are able to exchange information via a high-speed backbone such as optical fiber and a wireless backbone. One example is an ad-hoc wireless location system, where a set of scattered measuring stations receive signals transmitted from the target devices whose locations are of interest. The target devices emit signals for measuring stations. The locations of the target devices can be computed from the time-of-arrival (TOA) measurements. The location computation from the TOA measurements requires that the measuring stations have a common frequency or time base. The phase synchronization of measuring stations provides such a common base. This requires at least one phase-feedback device to transmit downlink-channel phase information to measuring stations according to various aspects and/or embodiments described hereinabove. Such phase-feedback devices can be from a subset of the target devices, or can be dedicated devices. The phase-feedback devices and the measuring stations should form a phase-synchronizable set. In more generic terms, the measuring stations are non-reference devices and the phase-feedback devices are phase-feedback reference devices.

While the foregoing disclosure describes illustrative aspects and/or embodiments, it should be noted that various changes and modifications could be made herein by those skilled in the art without departing from the scope of the described aspects and/or embodiments as defined by the appended claims. Furthermore, all or a portion of any aspect and/or embodiment can be utilized with all or a portion of any other aspect and/or embodiment, unless stated otherwise. It is, therefore, to be understood that the appended claims are intended to cover all such modifications, changes, and combinations as fall within the true spirit and the scope of the disclosed subject matter.

What is claimed is:

1. A method for communications in a wireless network with a predetermined signal bandwidth, having a multipoint-broadcast set comprising a plurality of base stations and a plurality of mobile users, some of said mobile users being phase-feedback mobile users, comprising:
    (a) sending downlink-pilot signals via a downlink channel from said base stations to said phase-feedback mobile users,
    (b) generating downlink-channel estimates at said phase-feedback mobile users,
    (c) sending standard uplink-pilot signals from said mobile users to said base stations,
    (d) generating uplink-channel estimates at said base stations,
    (e) transmitting downlink-channel phase information from said phase-feedback mobile users to said base stations,
    (f) determining carrier-phase differences (CPDs) between said base stations and said phase-feedback mobile users,
    (g) exchanging said CPDs among said base stations, and
    (h) determining relative phases between said base stations from said CPDs,
    whereby said base stations are phase-synchronized when said relative phases have been determined, and said base stations are able to determine the pre-coding matrix for multipoint broadcasting with said uplink-channel estimates and said relative phases.

2. The method of claim 1, wherein there is only one said phase-feedback mobile user, whereby the feedback overhead is reduced.

3. The method of claim 1, wherein there are at least two said phase-feedback mobile users, whereby the accuracy of said relative phases is improved.

4. The method of claim 1, wherein transmitting said downlink-channel phase information further comprises:
    (a) embedding said downlink-channel phase information in special uplink pilots at each phase-feedback mobile user, each said special uplink pilot being for each said base station to which said phase-feedback mobile user has a phase-feedback and
    (b) transmitting said special uplink pilots from said phase-feedback mobile users to said base stations,
    whereby said base stations are able to determine said CPDs from said special uplink pilots.

5. The method of claim 1, wherein transmitting said downlink-channel phase information uses model-based downlink-channel phase feedback, further comprising:
    (a) determining the parameters of a predetermined model for said CPDs and/or relative phases at said base stations from said downlink-channel phase information, and
    (b) determining said CPDs and/or said relative phases from said predetermined model over the entire said predetermined signal bandwidth,
    whereby the amount of said downlink-channel phase information to be transmitted by said phase-feedback mobile users is reduced by the use of said model-based downlink-channel phase feedback.

6. The method of claim 5, wherein said predetermined model for said CPDs and/or said relative phases is linear in frequency over the entire said signal bandwidth.

7. The method of claim 5, wherein said predetermined model comprises a fixed/slow-varying component and a fast-changing component, further comprising:
    (a) calibrating and storing said fixed/slow-varying component of said predetermined model prior to a multipoint-broadcast session, and
    (b) generating at said phase-feedback mobile users said downlink-channel phase information the amount of which is sufficient for said base stations to determine the parameters of said fast-changing component of said predetermined model,
    whereby the amount of downlink-channel phase information to be transmitted is reduced by calibrating and storing said fixed/slow-varying component of said predetermined model.

8. The method of claim 5, wherein said predetermined model comprises a nonlinear component and a linear component, further comprising:
    (a) calibrating and storing said nonlinear component of said predetermined model prior to a multipoint-broadcast session, and
    (b) generating at said phase-feedback mobile users said downlink-channel phase information the amount of which is sufficient for said base stations to determine the parameters of said linear component of said predetermined model, whereby the amount of said downlink-channel phase information to be transmitted is reduced by calibrating and storing said nonlinear component of said predetermined model.

9. A method for communications in a wireless network with a predetermined signal bandwidth, having a plurality of non-reference devices and a plurality of reference devices, some of said reference devices being phase-feedback reference devices, and said non-reference devices and said reference devices forming a phase-synchronizable set, comprising:
(a) sending downlink-pilot signals via a downlink channel from said non-reference devices to said phase-feedback reference devices,
(b) generating downlink-channel estimates at said phase-feedback reference devices,
(c) transmitting downlink-channel phase information from said phase-feedback reference devices to said non-reference devices,
(d) determining carrier-phase differences (CPDs) between said non-reference devices and said phase-feedback reference devices,
(e) exchanging said CPDs among said non-reference devices, and
(f) determining relative phases between said non-reference devices from said CPDs,
whereby said non-reference devices are phase-synchronized when said relative phases have been determined.

10. The method of claim 9, wherein said wireless network is a wireless cellular network, said non-reference devices being base stations, said reference device being mobile users, said phase-feedback reference device being phase-feedback mobile users, and said phase-synchronizable set comprising said base stations, said mobile users, and one or more multipoint-broadcast set, further comprising:
(a) sending standard uplink-pilot signals from said mobile users to said base stations in each said multipoint-broadcast set, and
(b) generating uplink-channel estimates at said base stations in each said multipoint broadcast set,
whereby in each said multipoint-broadcast set, said base stations that have been phase-synchronized independently of said multipoint-broadcast set are able to determine the pre-coding matrix for multipoint broadcasting using said uplink-channel estimates.

11. The method of claim 9, wherein transmitting the downlink-channel phase information further comprises:
(a) embedding said downlink-channel phase information in special uplink pilots at each phase-feedback reference device, each said special uplink pilot being for each said non-reference devices to which said phase-feedback reference device has a phase-feedback link, and
(b) transmitting said special uplink pilots from said phase-feedback reference devices to said non-reference devices,
whereby said non-reference devices are able to determine said CPDs from said special uplink pilots.

12. The method of claim 9, wherein transmitting said downlink-channel phase information uses model-based downlink-channel phase feedback, further comprising:
(a) determining the parameters of a predetermined model for said CPDs and/or relative phases at said non-reference devices from said downlink-channel phase information, and
(b) determining said CPDs and/or said relative phases from said predetermined model over the entire said predetermined signal bandwidth,
whereby the amount of said downlink-channel phase information to be transmitted by said phase-feedback reference devices is reduced by the use of said model-based downlink-channel phase feedback.

13. The method of claim 12, wherein said predetermined model for said CPDs and/or said relative phases is linear in frequency over the entire said signal bandwidth.

14. The method of claim 12, wherein said predetermined model comprises a fixed/slow-varying component and a fast-changing component, further comprising:
(a) calibrating and storing said fixed/slow-varying component of said predetermined model prior to phase synchronization of said non-reference devices in said phase-synchronizable set, and
(b) generating at said phase-feedback reference devices said downlink-channel phase information the amount of which is sufficient for said non-reference devices to determine the parameters of said fast-changing component of said predetermined model,
whereby the amount of downlink-channel phase information to be transmitted is reduced by calibrating and storing said fixed/slow-varying component of said predetermined model.

15. The method of claim 12, wherein said predetermined model comprises a nonlinear component and a linear component, further comprising:
(a) calibrating and storing said nonlinear component of said predetermined model prior to phase synchronization of said non-reference devices in said phase-synchronizable set, and
(b) generating at said phase-feedback reference devices said downlink-channel phase information the amount of which is sufficient for said non-reference devices to determine the parameters of said linear component of said predetermined model,
whereby the amount of downlink-channel phase information to be transmitted is reduced by calibrating and storing said nonlinear component of said predetermined model.

16. The method of claim 9, wherein said phase-feedback reference devices are chosen from said reference devices dynamically, depending on various criteria such as the quality of the channels between said reference devices and said non-reference devices.

17. The method of claim 9, wherein the feedback link of each said phase-feedback reference device to each said non-reference device is established and/or relinquished dynamically, depending on various criteria such as the quality of the channel between said phase-feedback reference device and said non-reference device.

* * * * *